United States Patent
Pfefferle et al.

[11] Patent Number: 5,866,078
[45] Date of Patent: Feb. 2, 1999

[54] OXYGEN STORAGE SYSTEM

[75] Inventors: William C. Pfefferle; Subir Roychoudbury, both of Madison, Conn.

[73] Assignee: Precision Combustion, Inc., New Haven, Conn.

[21] Appl. No.: 985,442

[22] Filed: Dec. 5, 1997

Related U.S. Application Data

[63] Continuation-in-part of Ser. No. 724,259, Sep. 19, 1996, abandoned.

[51] Int. Cl.$^6$ .................................................. B01D 53/34
[52] U.S. Cl. .................. 422/177; 422/171; 422/174; 422/180; 422/199; 422/222; 60/297
[58] Field of Search ...................... 422/171, 174, 422/177, 180, 199, 211, 222; 502/326–327, 439, 334, 527.12, 527.19, 304; 60/299, 300, 297; 55/523, DIG. 30

[56] References Cited

U.S. PATENT DOCUMENTS

| | | | |
|---|---|---|---|
| 4,407,785 | 10/1983 | Pfefferle | 422/171 |
| 5,051,241 | 9/1991 | Pfefferle | 422/180 |
| 5,229,079 | 7/1993 | Harada et al. | 422/174 |
| 5,234,668 | 8/1993 | Harada et al. | 422/174 |

*Primary Examiner*—Hien Tran
*Attorney, Agent, or Firm*—Kane, Dalsimer, Sullivan, Kurucz, Levy, Eisele and Richard

[57] ABSTRACT

This invention which combines an oxygen storage system with a catalytic converter to enhance the conversion of common pollutants found in the exhaust gas stream of an internal combustion engine. The oxygen storage element is placed upstream of the catalytic converter and is designed to extract excess oxygen from the exhaust gas stream and release the extracted oxygen when the exhaust gas stream is oxygen deficient. Controlling the oxygen level in this manner allows for effectiveness of the converter to be increased.

12 Claims, 1 Drawing Sheet

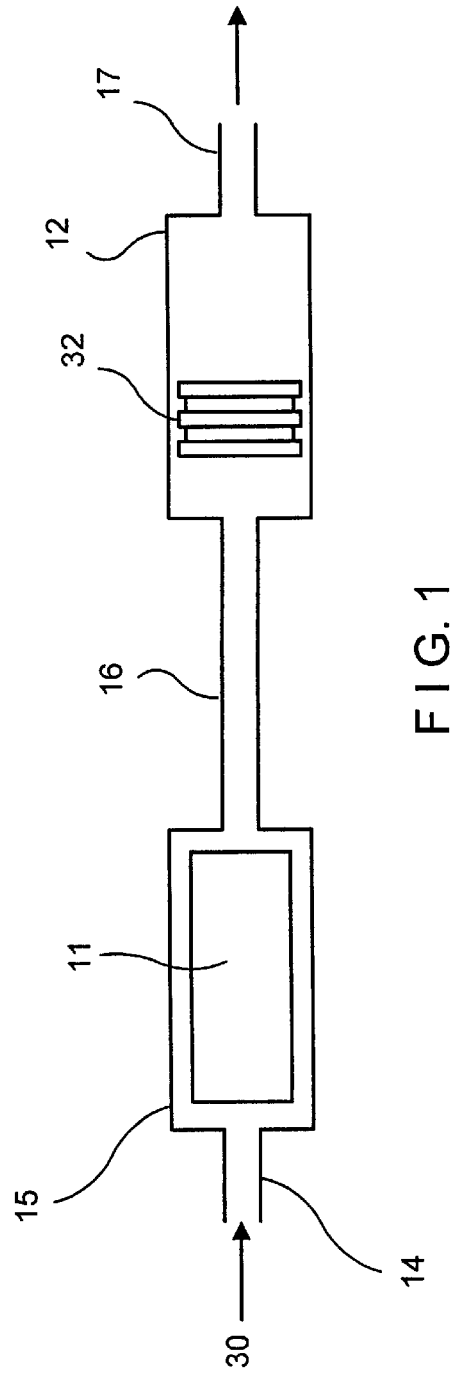
FIG. 1
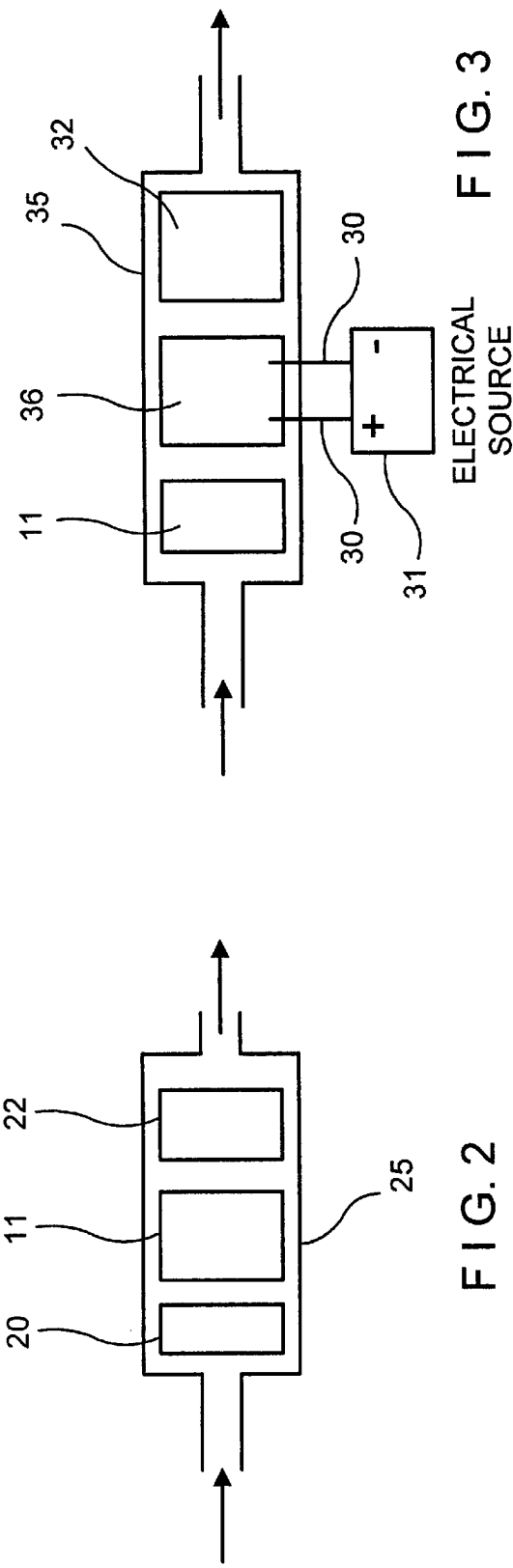
FIG. 3
FIG. 2

OXYGEN STORAGE SYSTEM

CROSS REFERENCE TO RELATED APPLICATION

This application is a Continuation-In-Part of U.S. Ser. No. 08/724,259 filed Sep. 19, 1996 and now abandoned.

BACKGROUND OF THE INVENTION

1. Field of the Invention

This invention relates to improved catalytic reaction systems and to methods for catalytic reaction of carbon containing compounds. In one specific aspect, the present invention relates to improving the catalytic conversion of gases in a catalytic converter utilizing short channel substrate.

2. Brief Description of the Related Art

Undesirable emissions from internal combustion engines, particularly those in automobiles, continue to be a major environmental problem in spite of significant reductions in these emissions resulting from the use of catalytic converters. A factor limiting the performance of catalytic converters is that the undesirable emissions are a concoction of pollutants, each pollutant placing an individualized requirement on the catalytic converter to effect its conversion. The conversion ability of today's catalytic converters is dependent upon the availability, or lack thereof, of oxygen. For example, the destruction of carbon monoxide and unburned hydrocarbons requires the presence of sufficient oxygen where as the destruction of nitrogen oxides is inhibited by oxygen. If all three pollutants are to be controlled, a mechanism is required to regulate the presence and quantity of oxygen within the catalytic converter.

Oxygen availability within the catalytic converter can be regulated by operating the engine such that the amount of oxygen delivered to the catalytic converter is controlled by regulating oxygen entering the engine relative to the fuel to be consumed, thereby regulating the oxygen within the engine exhaust gas stream. This control scheme requires that the engine be operated very close to stoichiometric fuel-air ratio if all three pollutants are to be controlled. Although the mean stoichiometry can be closely controlled, under today's driving conditions large variations can occur with typical control systems causing catalytic conversion inefficiencies and thus undesirable levels of pollution.

To refine the regulation of oxygen within the converter, substrate coatings utilized within the converter have been engineered to incorporate, in addition to a catalytic component, an oxygen storage capability. In operation, the oxygen storage capability absorbs excess oxygen from the exhaust stream, to allow nitrogen oxide conversion and releases oxygen to an oxygen deficient exhaust stream for hydrocarbon and carbon monoxide conversion. Ceria is typically used to provide this oxygen storage capability. To provide sufficient oxygen storage, a heavy loading of ceria is required, typically an amount at least ten or twenty times that of the precious metal loading and often as much as one hundred times greater. With current engine controls, a total weight of ceria of at least about twenty to thirty grams per liter of engine displacement is normally required or about thirty to forty grams of ceria per liter of monolith catalyst.

Short-channel, direct-coated, catalytic reactors, such as those of U.S. Pat. No. 5,051,241, incorporated herein by reference, allow for much more effective utilization of the catalytic components of the catalytic coating, thus are capable of being designed into highly efficient, compact reactors, having as little as a tenth the volume of a monolith converter sized for equivalent conversion effectiveness. A typical compact converter is forty to fifty percent the size of a conventional monolith converter for improved performance. To assure optimum conversion effectiveness in direct coated compact converters, the platinum group metals applied to the substrate represent more than 50% by weight of the coating with the remainder other materials, such as bonding agents and stabilizers. As a result, oxygen storage oxides, such as ceria, are practically limited in compact reactors to an amount less than that of the catalytic metal, typically less than twenty percent of the coating or no more than about one percent of the catalyst weight, an amount insufficient to provide an effective oxygen storage capability. As a result, customary deviations in exhaust stoichiometry hinder the ability of a stand-alone short-channel, direct-coated, catalytic reactor to meet ULEV or lower emission levels without a major improvement in engine fuel-air ratio management.

Short-channel, direct-coated reactors such as those of U.S. Pat. No. 5,051,241 can use an under layer of ceria (or alumina) prior to deposition of the platinum metal layer, but the maximum ceria content suggested to be deposited on the substrate is an amount that would create a roughly equivalent layer to that of the catalyst layer or a weight about 66% of that of the platinum. In addition, overcoating the ceria with a plating layer as taught in '241 blocks contact of the ceria with the exhaust gases rendering the ceria ineffective for oxygen storage.

The present invention makes possible the integration of an optimum oxygen storage device within a short-channel, direct-coated, catalytic reactor for the control of pollutants from an automotive internal combustion engine. This invention therefore allows an internal combustion engine to meet or even exceed California's stringent ULEV emissions requirements with available engine controls.

SUMMARY OF THE INVENTION

It has now been found that the performance of a short-channel, direct-coated, catalytic reactor (hereinafter compact catalytic reactor) such as those of U.S. Pat. 5,051,241 can be improved by placing an oxygen storage element, a single or multiple substrates, coated with an oxygen storage compound (hereinafter an oxygen element), upstream of the compact catalytic reactor. The oxygen storage element absorbs oxygen during lean, excess oxygen periods enhancing destruction of nitrogen oxides (NOx) and releases oxygen during rich, oxygen deficient periods thereby enhancing destruction of hydrocarbons and carbon monoxide. The result is a system combining the ultra-low emissions capability of compact catalytic reactors with the control system insensitivity of conventional monolith catalytic converters. Thus, the present invention allows the achievement of ultra-low emissions from engines with conventional controls which allow periodic variations in stoichiometry.

The oxygen element can be made using numerous substrates, such as one or more miniliths (a short channel substrate wherein the flow channels are less than four millimeters in length, more than forty channels per square centimeter, and a channel diameter preferably less than two to one, where the channel diameter is defined by the largest diameter circle which will fit within the given flow channel) or a single long channel length monolith. For the present invention, the monolith is given an oxygen storage capability for example by coating it with a wash coat having an oxygen storage compound, such as cerium oxide, in amount sufficient to yield a loading of at least about 10% by weight. To improve oxygen storage and release kinetics, the oxygen element may be given a catalytic component, such as platinum and/or palladium and may be deposited on a high surface area wash coat such as gamma alumina. The catalytic component, however, cannot exceed 10% of the oxygen storage compound weight, preferably about 0.01 to 5.0%.

The amount of oxygen storage compound to be located within the oxygen element is based on the oxygen storage desired, as determined by the maximum expected oxygen requirements for conversion of the engine exhaust. The oxygen storage compound amount can be determined using calculations similar to the following. To absorb all the oxygen available within one requirement cycle, the exposed surface loading of cerium oxide, the cerium oxide with direct contact with the exhaust gas flow stream, needs to be greater than the calculated minimum. The exposed surface loading is calculated as follows, with appropriate conversion factors for unit consistency:

mols $O_2$ to be absorbed* x Absorption Factor**
* desired absorption level, the amount of excess oxygen to be absorbed.
** in case of ceria the absorption factor is approximately 690 gms/mole $O_2$ based on the chemistry:
$4CeO_2 \leftrightarrow 2Ce_2O_3 + O_2$ To achieve a proper exposed surface loading on a standard substrate such as a conventional ceramic, an excess amount of at least twenty percent is employed. This will account for inefficiencies and margins, and non-exposed loading, to assure proper oxygen storage operation in the present invention. Ultimate loading will vary depending upon the substrate being used for the oxygen storage element, single monolith or multiple miniliths. Typically, at least about ten grams of ceria (or its equivalent) per liter of engine displacement are required. For the present invention, sufficient oxygen storage must be provided to remove at least fifty percent of the excess oxygen in the engine exhaust gases.

The catalyst coating of the compact catalytic reactor is optimized for conversion of the pollutants in the exhaust gas stream. The catalytic components are platinum group metals of typical automotive catalysts such as platinum, palladium, rhodium, and iridium or other catalytic metal, as required to meet the conversion and operational characteristics of the automotive engine. To enhance the performance of the present invention in meeting ULEV standards, a fast light-off, catalytic monolith (hereinafter a light-off element), such as a close-coupled, low-thermal-mass catalyst is advantageously placed in front of the oxygen storage element. A light-off element based on U.S. Pat. No. 5,051,241 is especially advantageous.

For additional fast light-off enhancement, an electrical heating device may be used. This device is placed upstream of the compact catalytic reactor, after the oxygen storage element, thus enabling quicker light-off of the compact catalytic reactor.

BRIEF DESCRIPTION OF THE DRAWINGS

FIG. 1 is a schematic showing an arrangement of an oxygen storage unit with a direct-coated, catalytic-metal element.

FIG. 2 shows a schematic with a preconverter element.

FIG. 3 depicts a schematic with an electrically heated element.

DETAILED DESCRIPTION OF THE INVENTION AND PREFERRED EMBODIMENTS

The present invention is further described in connection with the drawings.

As shown in FIG. 1, oxygen storage element 11 comprises an oxygen storage compound deposited on a substrate. Exhaust gas 30 enters oxygen storage element 11 mounted in conduit 15 through pipe 14. After passing through element 11 exhaust gas enters compact catalytic reactor 12 downstream of oxygen storage element 11 via pipe 16 and exits via pipe 17. In the preferred embodiment compact catalytic reactor 12 is an assembly of minilith catalyst elements 32. FIG. 2 shows a sectional view of a converter having a fast-light off element 20, which is comprised of a series of minilith catalyst elements, an oxygen storage element 11, and a compact catalytic reactor 22 all mounted in housing 25.

In FIG. 3, electrical heating unit 36, connected to power source 31 by lines 30, is shown mounted between oxygen storage element 11 and compact catalytic reactor 32 both of which are contained in converter housing 35.

The compact catalytic reactor of the present invention is readily made using known catalytic agents and metallic substrates. The following example describes a method for making the compact catalytic reactor. Following the teaching in U.S. Pat. No. 5,051,241, a reactor made using a minilith substrate may be made by vacuum sputtering a platinum group metal such as platinum or palladium onto a Nichrome metal screen which has been cleaned by heating in air. Typically, the platinum group metal coating may be as thin as 100 angstroms, but may be thicker for greater catalyst life. Advantageously, a similarly thin (approximately 100 angstrom thick) layer of an oxide such as alumina or ceria may be deposited prior to deposition of the platinum group metal. Catalysts containing iridium, rhodium or other metals can be similarly prepared.

An oxygen storage element 11 can be prepared as follows. The oxygen storage element 11 support can be made of a cordierite type substance or a high-temperature resistant metal alloy. It is a unitary structure composed of inorganic oxides or metals in the structure of a honeycomb with parallel channels which may be of different shapes. A metal monolith could also be wound in an S-shape with sinusoidal channels or a layered steel structure with sinusoidal channels or a layered steel structure with hexagonal shaped channels. A high surface area coating is deposited on the walls of the monolith. This coating consists of a carrier such as alumina and is impregnated with an oxygen storage component such as ceria and/or a precious metal catalytic component such as Pd. This is referred to as a washcoat or catalyzed washcoat.

In order to reduce emissions during a cold-start a lightoff converter or a preconverter is generally used in automobiles. This works by converting the exhaust emissions especially after start-up and before the main converter has reached its fully effective operating conditions. The preconverter may be placed in a separate can or housing close to the engine exhaust valves or may consist of a small converter located prior to the main converter within the same housing.

In certain automotive applications the temperature of the exhaust gas from the engine may be lower than the lightoff temperature of the catalyst on the preconverter or main converter during cold start. In order to increase the temperature of the gas entering the preconverter an an automotive air heater, comprising an electrically conductive resistance element, is heated by means of an electric current. This consequently heats up the inlet gas stream to the preconverter or main converter, thus allowing it to lightoff and begin conversion of polluting exhaust emissions.

What is claimed is:

1. A catalytic system for the treatment of automotive exhaust gases which comprises:

a) conduit means for channeling an automotive exhaust gas flow, b) an oxygen storage element positioned within said conduit means, said oxygen storage element comprising an oxygen storage compound, said oxygen storage compound having a surface exposed to the exhaust gas flow and being in amount of at least 10% by weight which is is sufficient to absorb at least 50% of excess oxygen within said exhaust gas when an air/fuel ratio of the exhaust gas flowing therethrough is lean and release the absorbed oxygen when the air/fuel ratio of the exhaust gas flowing therethrough is rich, and c) a catalytic reactor, said catalytic reactor comprised of a catalytically active coating deposited on a substrate, said catalytically active coating comprised of greater than 50% by weight of catalyst components, said catalytic reactor positioned in said conduit downstream of said oxygen storage element with respect to the exhaust gas flow.

2. The system of claim 1 wherein said catalytic reactor is a compact catalytic reactor.

3. The system of claim 1 further comprising a fast light-off element, said fast light-off element deployed upstream of said oxygen storage element.

4. The system of claim 1 further comprising an electrical heating element, said electrical heating element deployed downstream of said oxygen storage element and upstream of said catalytic reactor.

5. The system of claim 3 wherein said fast light-off element comprises a minilith substrate.

6. The system of claim 1 wherein said oxygen storage compound comprises ceria.

7. A method for the treatment of automotive exhaust gases, comprising:

a) passing said exhaust gas through an oxygen storage element, said oxygen storage element comprising an oxygen storage compound, said oxygen storage compound having a surface exposed to the exhaust gas being in an amount of at least 10% by weight which is sufficient to absorb at least 50% of excess oxygen in said exhaust gas when an air/fuel ratio of the exhaust gas flowing therethrough is lean and release the absorbed oxygen when the air/fuel ratio of the exhaust gas flowing therethrough is rich; and b) passing said exhaust gas exiting said oxygen storage element through a catalytic reactor.

8. The method of claim 7 wherein said catalytic reactor is a compact catalytic reactor.

9. The method of claim 7 further comprising passing said exhaust gas through a fast light-off element prior to said exhaust gas entering said oxygen storage element.

10. The method of claim 7 further comprising passing said exhaust gas through an electrical heating element prior to said exhaust gas entering said catalytic reactor.

11. The method claim 9 wherein said fast light-off element comprises a minilith substrate.

12. The method of claim 7 wherein said oxygen storage compound comprises ceria.

* * * * *

UNITED STATES PATENT AND TRADEMARK OFFICE
CERTIFICATE OF CORRECTION

PATENT NO. : 5,866,078
DATED : February 2, 1999
INVENTOR(S) : William C. Pfefferle; Subir Roychoudbury It is certified that error appears in the above-indentified patent and that said Letters Patent is hereby corrected as shown below:

Column 2, line 27, change "plating" to --platinum--.

Signed and Sealed this

Nineteenth Day of October, 1999

Q. TODD DICKINSON

Attest:

Attesting Officer

Acting Commissioner of Patents and Trademarks